3,106,451
METHOD OF PRODUCING MANGANESE SULFATE

Alfred R. Globus, Forest Hills, N.Y., assignor to United International Research, Inc., Long Island City, N.Y., a corporation of New York
No Drawing. Filed Nov. 1, 1960, Ser. No. 66,423
10 Claims. (Cl. 23—117)

This invention relates to improvements in the winning of manganese values from ores. The invention more particularly relates to a process for recovering the manganese values from ores of the pyrolusite type, containing manganese in the form of manganese dioxide and particularly those ores containing the manganese dioxide in a lower concentration.

The pyrolusite ores generally preferred as a source of manganese are the foreign imported ores containing a high quantity of manganese dioxide as for example up to about 85%. While domestic pyrolusite ores are quite prevalent, the same are generally not preferred as a source of manganese due to the low content of manganese dioxide as for example 35–40%.

One object of this invention is a new, simple, and low cost process for winning manganese values from pyrolusite ores, which is particularly adapted for the refining of low grade ores.

A further object of this invention is a process for winning manganese values from pyrolusite ores which allows the simultaneous low cost production of sulphuric acid.

These and still further objects will become apparent from the following description:

In accordance with the invention, the manganese values are extracted from the pyrolusite ore by reacting the ore with a mixture of sulfur and an excess of free sulfuric acid to thereby convert the manganese dioxide to manganese sulfate which may be separated as a solution and further treated in the well known and conventional manners.

The starting ores which may be treated in accordance with the invention may be any known or conventional pyrolusite ore containing from 25 to 90 percent and preferably from 25 to 50 percent of $MnO_2$. The invention is particularly suitable for the treatment of the poorer ores containing from 25 to 35 percent of $MnO_2$.

The reagent reacted with the ore, in accordance with the invention, is obtained by mixing elemental sulfur of any commercial purity with an excess of concentrated sulfuric acid. The sulfuric acid used should have a concentration between about 65 and 100 and preferably 85 to 100 percent. While it is only necessary that an excess of the sulfuric acid be present in the mixture, generally about 1.75 to 2.5 mols of sulfuric acid per mol of sulfur and preferably 2 mols of sulfuric acid per mol of sulfur should be used. The mixing of the sulfur and the sulfuric acid may be effected at any temperature below about 70 degrees C. and generally at temperature between 15 and 30 degrees C. and preferably at normal temperature or below.

The acid mixture is then reacted with the ore to be treated by mixing the ore and acid mixture while heating to a temperature between about 100 degrees and 500 degrees C. and preferably 200–300 degrees C. The ore should preferably be in a finely divided form, as for example, to form ground to a size below 100 mesh (U.S. Standard screen size) or finer. The reaction may be effected by first mixing the ore and the acid mixture and then heating the same in any suitable apparatus, preferably while continuing mixing, or effecting the mixing and heating together, as for example, in an externally heated rotary kiln, a furnace with a pan equipped with rotating plows, or any other conventional heating and agitating means.

It is preferable that an amount of the acid mixture be used for the ore so that at least a mol of sulfur is available for reaction with each mol of manganese present in the ore, though, of course, a greater amount of the acid mixture may be used. If a lesser amount of the acid mixture is used, the reaction will still proceed but it will not be possible, of course, to recover all the manganese values from the ore.

After the reaction has been initiated, the same proceeds automatically and is exothermic so that the providing of additional heat is not necessary.

The mixing of the sulfur with the free sulfuric acid may result in a formation of a mixture of hyposulfurous acid and free sulfuric acid ($H_2S_2O_4 + H_2SO_4$) but the reaction of the sulfur to form the hyposulfurous acid is not necessary for the reaction and it is possible to proceed in accordance with the invention by mixing the ore with the sulfuric acid and subsequently adding the sulfur to the pasty mixture former, or alternately, by mixing ore with the sulfur and then adding the sulfuric acid. In any case, however, the reaction should not be commenced by the addition of heat until all of the three components are present. If the sulfur is first mixed with the ore, prior to the addition of the sulfuric acid, care should be taken that the mixture of the ore and the sulfur is maintained at a temperature below 100 degrees C. so as to avoid a violent reaction which will result in a fusing of the mass and the formation of a complex mixture of sulfates, oxides, and sulfides.

The completion of the reaction of the ore and the sulfuric acid and sulfur generally takes from about 2 to 8 hours and may be noted by water extraction of a sample. The resulting product is then leached with water, separated from the unreacted silicates and other gangue by filtration, centrifuging, settling, or the like resulting in the formation of clear $MnSO_4$ solution.

The manganese sulfate solution may be further treated in conventional and well-known manners, as for example subjected to electroylsis in a diaphragm cell in order to produce metallic manganese and free sulfuric acid; subjected to oxidation and neutralization to form pure manganese dioxide or evaporated and calcined to form manganese oxide ($MnO$ and $SO_3$, the latter of which may be absorbed to form sulfuric acid).

As may be seen with electroylsis or evaporation and calcination, the sulfur initially added to the reaction is converted into sulfuric acid so that as an end result, three mols of $MnO_2$ are extracted from the ore with conversion of each mol of sulfur into sulfuric acid.

The following examples are given by way of illustration and not limitation:

Example 1

A reagent is formed by mixing 40 pounds of sulfur with 240 pounds of 97% sulfuric acid (at room temperature).

660 pounds of a pyrolusite ore containing 40% $MnO_2$ is ground to a size below 200 mesh and mixed with the acid-sulfur reagent in a rotary kiln while externally heating to a temperature above 300 degrees C. The mixing is continued for 5 hours and the resulting product is leached with water, separated from the unreacted silicates and other gangue by filtration. A clear $MnSO_4$ solution is obtained with a yield of 405 pounds of $MnSO_4$.

Example 2

37 pounds of sulphur of commercial purity are mixed with 235 pounds of sulfuric acid having a 94% concentration at room temperature. To this acid mixture 540 pounds of a pyrolusite ore containing 52% $MnO_2$ and having a particle size below 240 mesh are added. The mixture is heated in a furnace provided with a pan equipped with rotary plows to 270 degrees C. and after 5 hours the reaction mixture is leached with water, the resulting solution filtered, resulting in the formation of a clear $MnSO_4$ solution. The yield is 422 pounds of $MnSO_4$.

*Example 3*

42 pounds of sulfur are mixed together with 250 pounds of sulfuric acid of 97% concentration and 565 pounds of a pyrolusite ore is added with thorough mixing. The ore contains 48% $MnO_2$ and has a particle size below 200 mesh. The mixture is heated to 300 degrees C. for 5 hours and after further treatment, as described in Examples 1 and 2, 428 pounds of $MnSO_4$ are obtained.

*Example 4*

Example 1 is repeated except that the sulfur is mixed with the ore at room temperature and the acid subsequently added. Comparable results are obtained.

*Example 5*

Example 2 is repeated except the ore is first mixed with the sulfuric acid at room temperature and thereafter the sulfur is added. After the addition of the sulfur the heating is effected. Comparable results are obtained.

I claim:

1. Process for winning manganese values from manganese dioxide containing ore which comprises reacting at a temperature of at least 100° C. the ore with a mixture of elemental sulfur and an excess of sulfuric acid, and separating the manganese sulfate formed.

2. Process according to claim 1 in which said reaction is initiated by heating to a temperature between about 200–300 degrees C.

3. Process ccording to claim 1 in which the mol ratio of sulfur to sulfuric acid in the mixture is about 1:2.

4. Process according to claim 1 in which the reaction is effected with said mixture containing at least an equimolecular amount of sulfur based on the manganese in the ore.

5. Process according to claim 1 in which the ore has a particle size below about 100 mesh.

6. Process according to claim 1 in which the acid is initially mixed with the ore, the sulfur added, and the mixture heated to reaction temperature.

7. Process according to claim 1 in which the sulfur is initially mixed with the ore, the acid added and the mixture heated to reaction temperature.

8. Process according to claim 1 in which the manganese sulfate formed in the reaction is separated by leaching the reaction product with water and removing the solids.

9. Process for winning manganese values from manganese dioxide containing ore which comprises reacting, by heating to a temperature between about 200–300 degrees C., the ore having a particle size below about 100 mesh with a mixture of elemental sulfur and concentrated sulfuric acid in a mol ratio of about 1:2 and separating the manganese sulfate formed.

10. Process according to claim 9 in which said ore is a low-grade ore containing less than about 40% $MnO_2$.

References Cited in the file of this patent

UNITED STATES PATENTS

| | | |
|---|---|---|
| 1,325,129 | Westling | Dec. 16, 1919 |
| 2,343,293 | Hannay et al. | Mar. 7, 1944 |

OTHER REFERENCES

Smith: "Introduction to Inorganic Chemistry," the Century Company, New York, rewritten 3d Edition, 1921, page 425.

Mellor: "A Comprehensive Treatise on Inorganic and Theoretical Chemistry," Longmans, Green & Company, New York, N.Y., volume 10, 1930, page 94.

Jacobson: "Encyclopedia of Chemical Reactions," Reinhold Publishing Company, New York, 1951, pages 519–520.